Patented Sept. 12, 1950

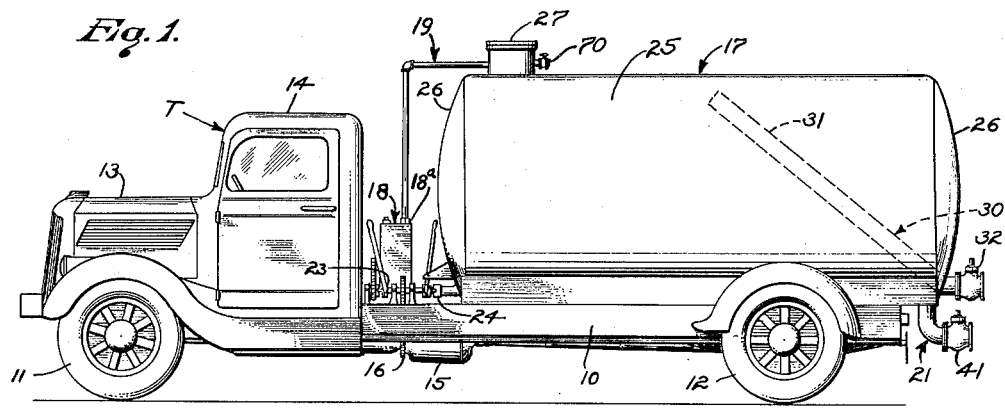

2,522,077

UNITED STATES PATENT OFFICE 2,522,077

TANK TRUCK

Lorenz R. Wahl and James E. Ogden,
Long Beach, Calif.

Application November 20, 1945, Serial No. 629,884

4 Claims. (Cl. 214—83.32)

1

This invention has to do with a tank truck and is more particularly concerned with a truck for handling debris or materials that are thick or difficult, if not impossible, to handle with ordinary equipment or by ordinary methods.

There are numerous situations where liquid or semi-liquid debris or materials have to be moved or handled and yet they are so thick or of such character that they cannot be pumped and are such that when once deposited in a tank for transportation they will not flow out of the tank when it is time to discharge them, but rather, have to be removed by methods or equipment ordinarily required for solid materials. An example of such a situation is debris from sumpholes such as occur in oil fields. This material is usually a thick heavy mixture of crude oil, water, sand, sticks, rags, and other such materials, and is such that it will clog ordinary pumps and when once deposited in a tank a substantial portion of it will settle and become packed so that when the tank is opened to be emptied only a portion of the material will drain out. The practical difficulty presented by such material is that a tank truck used for handling such materials after being loaded cannot successfully dump the load, and consequently it usually makes subsequent loads with an accumulation of material from previous loads still in the tank, all with the result that the whole operation is inefficient and tedious. Even when an ordinary tank truck is used and it is recognized that only a part of the load is dumped when the tank is opened, it becomes necessary at intervals to enter the tank and dislodge the settled material. Otherwise the tank gradually fills up until it is of little or no practical use.

It is a general object of our present invention to provide a portable tank suitable for receiving debris such as we have referred to, which tank is equipped with an outlet opening and with means for feeding material in the tank to the opening to facilitate the discharge of the material from the tank.

By our present invention we provide an outlet opening in the bottom of the tank and we provide a feed screw in the bottom of the tank which screw is power driven so that it can be put in operation when it is desired to empty the tank so that it causes the materials that normally accumulate in the tank to be fed to the outlet opening to be discharged along with the materials that naturally drain from the tank.

It is another object of our invention to provide a portable debris handling tank having an inlet pipe for discharging material into the upper portion of the tank and having the suction line of a suction pump connected to the top of the tank so that material is caused to enter the tank through differential pressure resulting from air being exhausted from the tank, with the result that atmospheric pressure on the debris at the outside of the tank causes it to flow through the inlet pipe into the tank.

It is another object of our invention to provide a tank truck which is a complete unit and which has a power take-off operable to drive a suction pump for withdrawing air from a debris-carrying tank on the truck and for driving a feed screw in the tank, which feed screw is operable to feed material in the lower portion of the tank to an outlet opening so that it is discharged from the tank along with materials that will normally flow from the tank through the outlet opening.

The various objects and features of our invention will be fully understood from the following detailed description of a typical preferred form and application of the invention, throughout which description reference is made to the accompanying drawings, in which:

Fig. 1 is a side elevation of a tank truck embodying our present invention. Fig. 2 is an enlarged, longitudinal sectional view of the tank element as such, and Fig. 3 is an enlarged side elevation taken at the forward end portion of the tank or between the cab of the truck and the forward end of the tank, showing the drive connection from the power take-off of the truck to the suction pump and to the feed screw of the tank.

The unit provided by our invention includes, generally, a truck T having a frame or chassis 10 carried by forward wheels 11 and rear wheels 12. The truck further includes an engine or power plant 13 at its forward end and the usual driver's cab 14 immediately behind the power plant. We may employ any suitable heavy truck and preferably employ one having a suitable power take-off 15 operable to drive a drive chain 16, or the like. The invention is in no way concerned with the details of the power take-off of the truck nor with the manner in which it drives the chain 16 or other power transmitting element. Therefore, these parts have only been shown in a general way in the drawings.

Our present invention provides a debris handling tank 17 on the truck, a suction pump 18 on the truck to be driven from the power take-off 15, a suction pipe 19 connecting the pump 18 with the top of the tank so that air or gas can be exhausted therefrom, a float control means 20 for the suction pipe 19, inlet means 30 for admitting debris or other material into the tank, outlet means 21 for allowing material to flow out of the tank, feed means 22 in the tank operable to feed material to the outlet means, a drive connection 23 between the power take-off 15 and the pump 18, and a drive connection 24 between the power take-off 15 and the feed means 22.

The tank that we provide may vary in size and shape, depending upon the character of the truck or the class of work to be performed. For ordinary service we prefer to provide a tank having an elongate cylindrical body 25 closed at its ends by suitable heads 26. Such a tank is simple and inexpensive of manufacture and can be advantageously arranged on a truck T such as we have illustrated in the drawings.

The suction pump 18 may be any suitable form or type of pump that will operate to exhaust air or gas from the tank 17. In the drawings we have illustrated a suitably housed pump located between the forward end of the tank and the rear of the cab of the truck, but have not shown the details of the pump mechanism since our invention is not concerned with such particulars.

The suction pipe 19 that we provide is connected to the inlet or suction 18ª of the pump 18 and extends from the pump 18 to the upper portion or top of the tank. In the particular case illustrated we show the pipe 19 entering the tank through a suitable head or dome 27 provided on the top of the tank. However, it will be understood that in practice the suction pipe may be connected to the tank in any suitable manner. The float control 20 that we provide involves a suitable control valve 28 connected to the pipe preferably within the dome 27 to control flow through the pipe 19 and a float 29 arranged in the upper portion of the tank and connected with the valve 28 through a suitable lever connection 29ª so that when the float is lifted to a predetermined position in the tank by liquid or material in the tank the valve 28 is closed. It is to be understood, of course, that in practice we can use any sort of float control means, or the like, that will serve to either cut off the suction pump 18 or close the suction pipe 19 when the tank is filled to the desired point.

The inlet means 30 that we have provided preferably includes an inlet pipe 31 entering the tank from the lower portion thereof, and at the rear end thereof, and extending upward in the tank to a point near the top thereof. In the preferred arrangement the pipe 31 is a large pipe that is straight and which extends up in the tank at an angle so that the material discharging from its upper end falls into the tank at a point approximately midway between the ends of the tank. The inlet means further includes a suitable control valve 32 in connection with the pipe 31. In practice, the valve 32 is preferably located at the exterior of the tank so that it can be conveniently operated and it can be provided with coupling means 33 such as a flange, or the like, whereby it can be connected to a feed line through which material is supplied for introduction into the tank. It is to be understood that when we refer to a valve 32 we mean to include any suitable flow control device such as any suitable plug or valve, either a gate valve, plug valve, or any other type that may be employed to serve the purpose.

The outlet means 21 which we provide includes or involves a drain pipe 40 connected into the bottom of the tank preferably near one end, and preferably near the rear end of the tank. In the particular case illustrated the drain pipe is a large pipe and is L-shaped, and the means 21 further includes a control valve 41 in connection with the pipe 40, which valve may be similar in character to the valve 32 of the means 30.

The feed means 22 which we provide in the tank 17 may be varied depending upon the service to be performed. For ordinary work, as for instance, for handling debris from the sump holes of oil fields, we have found it convenient to employ a feed screw in the tank which screw involves a shaft 45 supported by bearings 46 at the ends of the tank and a helical blade 47 carried by the shaft and pitched so that as the shaft is rotated it feeds material toward or to the drain pipe 40 which connects into the bottom of the tank. In the preferred arrangement one end only of the shaft 45 projects from the tank and this end of the shaft projects from the forward end of the tank to make connection with the drive means 24 hereinafter described.

The drive means 23 provided for operating the pump 18 from the power take-off 15 of the truck may, in practice, vary depending upon the character of the power take-off provided on the truck and upon the type of control desired between the power take-off and the pump. In the particular case illustrated we have shown the power take-off 15 of the truck driving a countershaft 50 through a chain 16. The drive means 23, as illustrated, involves a clutch 51 and chain drive 52 between the counter-shaft 50 and the drive shaft 53 of the pump. The clutch, as illustrated, is under control of a lever 54.

The drive means 24 to be provided between the power take-off 15 of the truck and the feed screw 22 in the tank may, in practice, vary, depending upon the character of the power take-off and the particular screw to be driven. In the case illustrated we show a simple clutch 60 for connecting the counter-shaft 50 driven from the power take-off with the projecting end 45ª of the feed screw shaft. The end 45ª projects from the forward end of the tank and the clutch 60 is under control of a simple lever 62.

In operating the apparatus that we have provided, assuming the tank 17 to be empty, suitable feed pipe or hose is connected to the means 30, as for instance to the valve 32 of the means 30, so that the tank is connected with the body of fluid or debris to be handled. The pump 18 is then put into operation by engaging the clutch 51 and as the pump operates, air or gas in the tank is exhausted therefrom, so that a reduced pressure is established in the tank causing atmospheric pressure on material outside of the tank to force the material through the feed pipe or hose, through the valve 32, and through the pipe 31 so that it discharges into the tank. Material discharged into the tank builds up or accumulates until it reaches the float 29 and when it has moved the float 29 up to a desired point or to a point where the tank is full, the valve 28 is closed, thus cutting off the connection between the tank and the suction pump. The operator can then disengage the clutch 51 and remove or suitably manipulate the feed pipe or hose, as the case may be, making the vehicle ready for movement. The truck is then driven to the location where the debris is to be emptied, whereupon the valve 41 is opened and the clutch 60 is engaged so that the feed means 22 is driven. If desired, any suitable means may be utilized to admit air into the top of the tank as the material is discharged. For instance, an air inlet connection 70 may be provided in connection with the dome 27. When the valve 41 is open and the screw 22 is operating the materials that will normally flow naturally seek their way out through the drain pipe and valve and the materials that would otherwise accumulate and lodge in the tank and not drain therefrom are moved by the screw to the drain pipe 40 so that they are carried out with the first mentioned materials. It is to be understood, of course, that a suitable pipe or extension can be connected with the valve 41 to lead the materials thus discharged to any desired point, if that is necessary. It is also to be understood that we may, if desired, keep the screw 22 in motion or operating at all times, that is from the time the material is first loaded into the tank until it is discharged, if the material being handled is such that its handling is expedited by such operation.

Having described only a typical preferred form and application of our invention, we do not wish to be limited or restricted to the specific details herein set forth, but wish to reserve to ourselves any variations or modifications that may appear to those skilled in the art, and fall within the scope of the following claims:

Having described our invention, we claim:

1. Apparatus of the character described including an elongate portable tank, means for introducing material into the tank including a pipe with a portion accessible at the bottom of the tank adjacent one end thereof and discharging in the upper portion of the tank, means for discharging material from the tank including a feed screw arranged longitudinally in the lower portion of the tank operable to feed material to a discharge opening provided in the tank at said end thereof, and control valves for the pipe and opening located in close proximity to each other at said end of the tank.

2. Apparatus of the character described including, a motor driven vehicle, a cylindrical tank mounted horizontally on the vehicle, means for introducing material into the tank including a pipe discharging in the upper portion of the tank, means for exhausting air from the tank including a float controlled exhaust pipe connected with the upper portion of the tank and a suction pump driven by the motor of the vehicle, and means for discharging material from the tank including a feed screw in the bottom of the tank in free communication with the interior of the tank, driven by the motor of the vehicle and operable to feed material to a discharge conduit connected to the tank, and a control valve in the discharge conduit.

3. Apparatus of the character described including, a motor driven vehicle, a cylindrical tank mounted horizontally on the vehicle, means for introducing material into the tank including an inlet pipe discharging in the upper portion of the tank, means for exhausting air from the tank including a suction pump driven by the motor of the vehicle, an exhaust pipe connecting the pump and the upper portion of the tank, a valve in the exhaust pipe and a float in the upper portion of the tank controlling the valve, means for discharging material from the tank including an exposed feed screw in the bottom of the tank extending longitudinally of the tank and driven by the motor of the vehicle from one end of the tank and operable to feed material to a discharge opening provided in the bottom of the tank at the other end thereof, and control valves for the inlet pipe and the discharge opening located at said other end of the tank.

4. Apparatus of the character described including a motor driven vehicle, a cylindrical tank mounted horizontally on the vehicle, means for introducing material into the tank including an inlet pipe entering adjacent the bottom of the tank at one end thereof discharging in the upper portion of the tank, means for exhausting air from the tank including a suction pump driven by the motor of the vehicle, an exhaust pipe connecting the pump and the upper portion of the tank, a valve in the exhaust pipe and a float in the upper portion of the tank controlling the valve, means for discharging material including a discharge conduit connected to and in free communication with the interior of the tank at said end thereof, and control valves for the inlet pipe and the discharge opening located in close proximity to each other at said end of the tank.

LORENZ R. WAHL.
JAMES E. OGDEN.

REFERENCES CITED

The following references are of record in the file of this patent:

UNITED STATES PATENTS

| Number | Name | Date |
| --- | --- | --- |
| 1,165,736 | White | Dec. 28, 1915 |
| 1,398,790 | Ogur | Nov. 29, 1921 |
| 1,944,663 | Le May | Jan. 23, 1934 |
| 2,110,207 | Doran | Mar. 8, 1938 |
| 2,110,262 | Curtis | Mar. 8, 1938 |
| 2,116,603 | Holly | May 10, 1938 |
| 2,130,059 | Bosh | Sept. 13, 1938 |
| 2,130,099 | Peterson | Sept. 13, 1938 |
| 2,240,167 | Adams | Apr. 29, 1941 |